Nov. 21, 1967  G. D. GALE  3,353,337

TWO-PHASE CONTACTOR

Filed Sept. 14, 1964

Inventor
George D. Gale
By Robert B. Benson
Attorney

3,353,337
TWO-PHASE CONTACTOR
George D. Gale, Wauwatosa, Wis., assignor to Allis-Chalmers Manufacturing Company, Milwaukee, Wis.
Filed Sept. 14, 1964, Ser. No. 396,302
1 Claim. (Cl. 55—232)

This invention relates generally to two-phase contactors and more specifically to a two-phase contactor used for removing dust or other solid particles from a gas.

Two-phase contactors generally have a plurality of elements or surfaces which are alternately dipped into a liquid, then exposed to a gas and returned to the liquid. These contactors are also applicable to two immiscible liquids. A two-phase contactor is used as a means to selectively absorb or remove from a fluid certain elements or gases. One of the most common applications of this type of a device is for removing dust or gaseous compounds from a gas.

One of the most successful forms of two-phase contactors utilizes a plurality of disks mounted on a shaft and rotated into a liquid and then exposed to the gas being treated. As the disks are being rotated through the liquid phase the surfaces of the disks pick up a thin film of liquid. As the surface of the disk with the liquid film adhering thereto is exposed to the gas, the film becomes saturated with gas and/or solid particles in the gas which are then conveyed with the film to the liquid where they are washed off the disk.

In some applications of the contactors described above in which there is a heavy dust concentration in the air being purified, the buildup of solid particles on the first few disks of the contactor becomes so great that the contactor becomes inefficient. This invention relates specifically to one means of overcoming this particular problem.

In other applications, the gas leaving the contactor has a high concentration of liquid droplets or vapor that may be higly corrosive or otherwise objectionable. This invention also provides means for overcoming this condition.

In the two-phase contactor of this invention the tank in which the contactor disks rotate is partitioned off so as to have in the bottom half of the tank a so-called dry chamber and a wet chamber. If the gas to be treated is initially directed through the dry chamber, the dust adhering to the surface of the disks is scraped off or deposited by some other means and then removed from the chamber by a screw type conveyor or the like. In this way the bulk of the dust or solid particles are removed from the gas in the dry chamber and the remainder is removed in the liquid portion of the contactor. The liquid portion of the tank is filled with a suitable liquid to just below the center of the disks. In this chamber the disks dip into the liquid and pick up a thin film of liquid which in turn absorbs the very fine dust particles in the gas passing over the disks to completely purify the gas. According to this invention the gas to be treated can be directed through the contactor in either direction so as to contact either the wet or dry disks first. If the gas to be treated flows through the wet chamber first, the disks in the dry chamber serve the purpose of taking the liquid droplets and vapor out of the gas being treated. In some applications it may be desirable to have a dry chamber on either side of the wet chamber.

Therefore, it is the object of this invention to provide a new and improved two-phase contactor for treating a fluid.

Another object of this invention is to provide a new and improved two-phase contactor using a dry chamber with rotating disks for removing water droplets and vapor from the treated gas.

Another object of this invention is to provide a new and improved two-phase contactor using a wet and a dry chamber for removing solid impurities from a gas by passing through a dry chamber with rotating disks first and then through a wet chamber.

Other objects and advantages of this invention will be apparent from the following description when read in connection with the accompanying drawings, in which.

Figure 1:
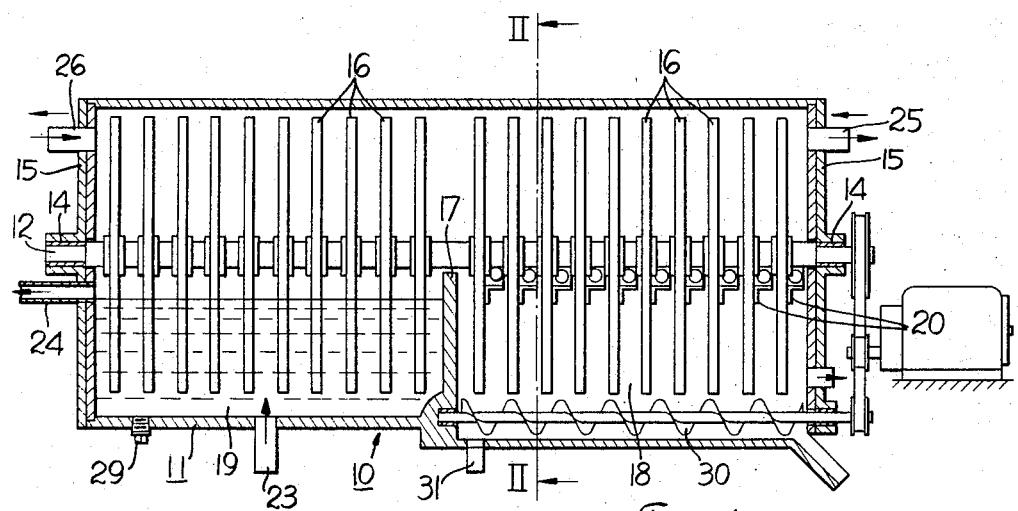
FIG. 1 is a cross section view of a two-phase contactor having the unique tank configuration of this invention.

Referring more specifically to the drawing by characters of reference, the two-phase contactor 10 of this invention is illustrated as a liquid gas contactor having a tank 11 with the gas to be treated flowing in the upper portion of the tank. A horizontally disposed shaft 12 is rotatably mounted in a pair of spaced apart bearings 14 mounted on the end plates 15 of the tank 11. A plurality of disks 16 are mounted on the shaft 12 at axially spaced intervals for rotation therewith in a substantially vertical plane. The disks can be of any suitable material or configuration as is known in the art.

The lower portion of the tank 11 is divided by partition 17 to form two chambers or compartments 18, 19 although there could be more if desired. Means are provided to supply each of these compartments with a different liquid or gas depending on the type of treatment to be performed. For example, the first compartment 18 may contain air and means such as blades 20 for scraping the dust from the disks. In the illustrated unit, a screw conveyor 30 is provided at the bottom of compartment 18 to remove dust which is accumulated therein.

The second compartment 19 may be filled with water or other suitable liquid which cooperates with the disks rotating through that compartment to remove dust or other particles in the gas passing through the tank. The compartment 19 is provided with a liquid inlet 23 and an outlet 24. The inlet can be placed anywhere but it is preferred that the outlet be positioned at the desired liquid level in the tank to function to control the liquid level in the compartment. In some cases it may be desirable to provide a clean-out plug 29 in the bottom of compartment 19 to clean out impurities that may settle in that section.

If the gas to be treated has a heavy concentration of dust or other solid particles, it is directed to flow first through the dry compartment 18 and then through the wet compartment 19. In this way all the disks serve primarily to remove dust or solid particles from the gas. On the other hand, if the gas to be treated contains a high concentration of material that would form harmful liquids or vapors, the gas flows through the wet chamber 19 first. In this case the disks 16 in the wet chamber serve to remove dust and other geseous compounds from the gas while the disks 16 in the other chamber 18 serve to dry the gas by removing liquid droplets and vapor.

In one operation the gas to be treated passes into the tank 10 through the opening 25 into the dry chamber 18, across and through the rotating disks 16 and out of the tank through opening 26. Dust in the gas to be treated impinges upon the disks and rebounds to the bottom of the compartment or clings to the surface of the disk 16 in compartment 18 and is removed from the surface of the disks by the scraper blade 20 positioned in the lower portion of the compartment. The dust that is scraped off the disks is accumulated at the bottom of compartment 18 and is removed by a suitable conveyer such as the illustrated screw conveyer 30. The operation in the dry compartment 18 removes the bulk of the dust passing through the tank in this direction. However, in the second or wet compartment 19 the surface of the disks 16 pick up the thin film of liquid which is exposed in the upper portion of the tank to the gas. The fine dust particles remaining in the gas are absorbed in the film liquid on the disks and are disposed in the liquid of the lower portion of these compartments when the film is washed off the surface of the disk into the liquid in the compartment. The dust collected in the liquid in the compartment becomes entrained therein and is removed through the outlet port 24. Any solids that settle out of the liquid and accumulate in the bottom of the tank can be removed through a suitable drain plug or other appropriate means.

If the gas is brought into the tank 11 through opening 26 it initially impinges on the liquid film on the surface of disks 16 in the wet compartment 19. These disks with liquid film thereon serve to remove the impurities such as dust from the gas but leave the gas with a high concentration of liquid and vapor therein. This liquid and vapor is removed by the revolving disks 16 in the dry chamber 18 and the gas leaves the tank 11 through opening 25 in a relatively dry condition. A suitable drain 31 is provided in compartment 18 for removing any liquid accumulated therein.

Figure 3:
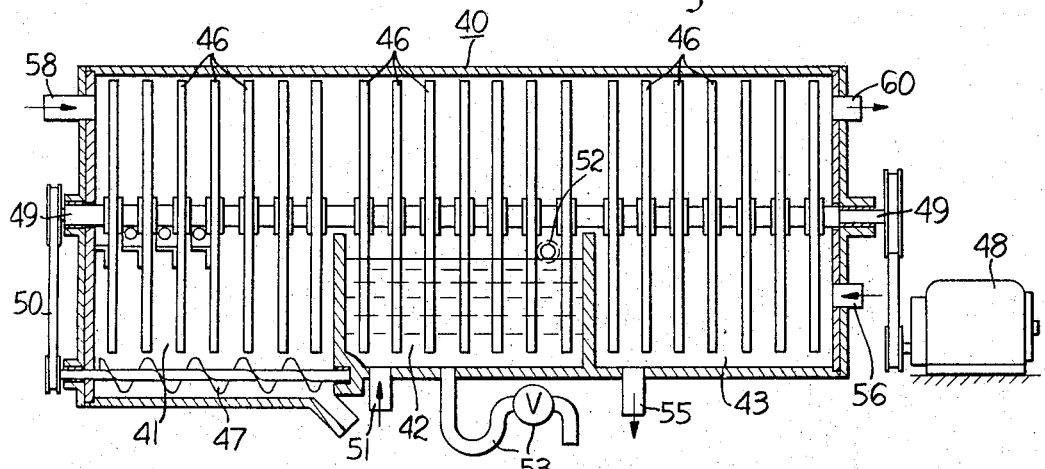
FIG. 3 is a cross section view of an alternate embodiment of this invention showing a tank having two dry chambers and one wet chamber.
Figure 2:
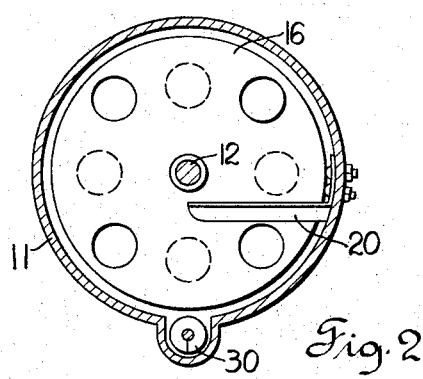
FIG. 2 is a cross section view taken along the line II—II of FIG. 1.

An alternate embodiment of this invention is shown in FIG. 3 in which the tank 40 is divided into three axially spaced compartments 41, 42 and 43. The first and last compartments 41 and 43 are designed to operate with a gas or in a dry condition. Hence, the internal surfaces of these compartments are formed to be substantially circular and to conform closely to the external perimeter of the disks 46 rotating therein. A screw conveyer 47 is positioned in the bottom of compartment 41 for removing dust that accumulates in this compartment. The screw conveyer 47 can be driven by the same motor 48 that operates the main shaft 49 of the contactor. For example, a V-belt drive 50 operatively connects the main shaft 49 to the screw conveyer shaft. The second compartment 42 is designed to contain water or other suitable liquid and has an appropriate inlet 51 and outlet 52. The inlet 51 can be positioned anywhere, but it is preferred that the outlet 52 be located near the level to which it is intended to maintain the liquid in the compartment. If desired, an appropriate drain and valve arrangement 53 can be provided for periodically removing portions of the liquid with entrained dust from the bottom of the compartment.

The third compartment 43 is designed to operate with a drying gas. In this compartment the excess moisture in the gas being treated is removed and, hence, an appropriate drain 55 is located in the bottom of this compartment for removing liquid accumulated therein. An inlet 56 may be provided to supply an appropriate dry gas to the compartment.

In the operation of the two-phase contactor of FIG. 3, the gas to be treated is directed through inlet 58 into the compartment 41 where a majority of the dust is removed from the gas by the apertured disks 46 rotating therein. The remainder of the dust is removed from the gas as it passes over the disks in wet compartment 42. However, during this process a certain amount of water vapor and droplets become entrained in the gas. As the gas flows through the compartment 43, the water vapor and droplets contact the dry disks and are removed from the gas. The liquid accumulated in this compartment is drained from the bottom of the tank through the drain 55. Hence, as the gas leaves the tank 40 through the outlet 60, it is substantially dry and dust free.

Although but two embodiments of this invention have been illustrated and described, it will be apparent to those skilled in the art that various changes and modifications may be made therein without departing from the spirit of the invention or the scope of the appended claim.

The embodiments of the invention in which an exclusive property or privilege is claimed are defined as follows:

A dust collector comprising an elongated tank having its longitudinal axis in an approximately horizontal plane; the lower portion of said tank being divided into at least three axially spaced compartments including entrance and exit compartments adjacent opposite ends of said tank; the center one of said compartments being partially filled with a liquid and the entrance and exit compartments being dry;

a shaft mounted for rotation in said tank about said horizontal axis, means for rotating said shaft;

a plurality of apertured disks in each of said compartments mounted on said shaft for rotation therewith and extending to adjacent the inner surface of said tank, overflow means in said liquid containing compartment to maintain the level of liquid in said compartment at a predetermined level, scraper means in said entrance compartment positioned adjacent said disks to remove solid particles adhering to the surface of said disks, conveyer means in the bottom of said entrance compartment to remove from said entrance compartment dust particles accumulated therein, drain means in said exit compartment to drain liquid accumulated therein, and means including inlet and outlet openings in said tank communicating respectively with said entrance and exit compartments for directing dust laden gas to be treated from said inlet opening through said tank and through the apertures in the disks in said entrance compartment, said liquid containing compartment and said exit compartment in succession and is exhausted from said outlet opening whereby upon rotation of said disks the gas passing through said tank is exposed to dry disks to remove dust, then to wet disks to further remove dust and then to dry disks to remove water droplets and vapor from the gas.

References Cited
UNITED STATES PATENTS

| | | | |
|---|---|---|---|
| 206,736 | 8/1878 | Kirkham | 261—92 |
| 1,806,021 | 5/1931 | Perkins | 55—230 |
| 1,893,667 | 1/1933 | Darlington | 23—270.5 |
| 2,139,871 | 12/1938 | Wilson et al. | 23—270.5 |
| 2,252,982 | 8/1941 | Roberts | 55—230 |
| 2,291,046 | 7/1942 | Lange | 261—92 |
| 2,774,655 | 12/1956 | Marullo et al. | 261—92 |
| 2,922,489 | 1/1960 | Hollingsworth | 55—232 |
| 2,998,099 | 8/1961 | Hollingsworth | 55—232 |

OTHER REFERENCES

Ametek, Inc., Niagara Filters Division, Integral Design Slashes Size of Continuous Pressure Filter, in Chemical Engineering, page 114, Oct. 14, 1963.

HARRY B. THORNTON, *Primary Examiner.*

B. NOZICK, *Assistant Examiner.*